(12) United States Patent
Wu (10) Patent No.: US 10,087,744 B2
(45) Date of Patent: Oct. 2, 2018

(54) FAST FORMATION DIP ANGLE ESTIMATION SYSTEMS AND METHODS

(71) Applicant: HALLIBURTON ENERGY SERVICES, INC., Houston, TX (US)

(72) Inventor: Dagang Wu, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/760,661

(22) PCT Filed: Jan. 17, 2013

(86) PCT No.: PCT/US2013/021929
§ 371 (c)(1),
(2) Date: Jul. 13, 2015

(87) PCT Pub. No.: WO2014/113008
PCT Pub. Date: Jul. 24, 2014

(65) Prior Publication Data
US 2016/0024908 A1    Jan. 28, 2016

(51) Int. Cl.
*E21B 47/09* (2012.01)
*G01V 3/28* (2006.01)
(Continued)

(52) U.S. Cl.
CPC ............ *E21B 47/09* (2013.01); *E21B 47/026* (2013.01); *G01V 3/28* (2013.01); *G01V 3/30* (2013.01); *G01V 3/38* (2013.01)

(58) Field of Classification Search
CPC . E21B 47/09; G01V 3/28; G01V 3/30; G01V 3/38
See application file for complete search history.

(56) References Cited

U.S. PATENT DOCUMENTS 6,393,364 B1    5/2002    Gao et al.
6,556,016 B2    4/2003    Gao et al.
(Continued)

FOREIGN PATENT DOCUMENTS

WO    2014/113008    7/2014

OTHER PUBLICATIONS

PCT International Search Report and Written Opinion, dated Mar. 19, 2013, Appl No. PCT/US2013/021929, "Fast Formation Dip Angle Estimation Systems and Methods", filed Jan. 17, 2013 13 pgs.
(Continued)

*Primary Examiner* — John Breene
*Assistant Examiner* — Yaritza H Perez Bermudez
(74) *Attorney, Agent, or Firm* — Benjamin Fite; Tumey L.L.P.

(57) ABSTRACT

Tools, systems and methods for fast formation dip angle estimation, at least some of which include a logging tool that includes at least one transmit antenna, at least one receive antenna and a controller. The controller measures coupling parameters between the transmit and receive antennas, with at least one of the coupling parameters being measured as a function of depth and azimuthal angle. The controller further determines if a surrounding formation is anisotropic and heterogeneous based at least in part on at least one of the coupling parameters, and if so, derives a dip angle from a partial derivative with respect to depth and artificial dip angle of the coupling parameter(s).

19 Claims, 3 Drawing Sheets

(51) Int. Cl.
  *E21B 47/026* (2006.01)
  *G01V 3/30* (2006.01)
  *G01V 3/38* (2006.01)

(56) References Cited

U.S. PATENT DOCUMENTS

| | | | |
|---|---|---|---|
| 6,584,408 B2 | 6/2003 | Omeragic | |
| 6,727,706 B2 | 4/2004 | Gao et al. | |
| 6,794,875 B2 | 9/2004 | Strickland | |
| 6,819,111 B2 | 11/2004 | Fanini et al. | |
| 7,496,451 B2 | 2/2009 | Fang et al. | |
| 8,085,050 B2 | 12/2011 | Bittar et al. | |
| 2003/0028324 A1* | 2/2003 | Xiao | G01V 3/38 702/7 |
| 2003/0030439 A1 | 2/2003 | Gao et al. | |
| 2005/0083061 A1* | 4/2005 | Tabanou | G01V 3/28 324/334 |
| 2007/0208546 A1* | 9/2007 | Fang | G01V 3/28 702/191 |
| 2007/0267192 A1* | 11/2007 | Wang | E21B 47/026 166/254.2 |
| 2010/0049443 A1* | 2/2010 | Mickael | G01V 11/002 702/10 |
| 2011/0106514 A1* | 5/2011 | Omeragic | G01V 11/00 703/10 |
| 2011/0254552 A1* | 10/2011 | Wu | G01V 3/28 324/339 |
| 2012/0293178 A1* | 11/2012 | Proett | G01V 3/18 324/333 |

OTHER PUBLICATIONS

PCT International Preliminary Report on Patentability, dated Mar. 18, 2014, Appl No. PCT/US2013/21929, "Fast Formation Dip Angle Estimation Systems and Methods," Filed Jan. 17, 2013, 8 pgs.

CN Office Action, dated Aug. 3, 2016, Appl No. 2013800674277, "Fast Formation Dip Angle Estimation Systems and Methods," Filed Jan. 17, 2013, 24 pgs.

CA Examiner's Report, dated Sep. 14, 2016, Appl No. 2,895,780, "Fast Formation Dip Angle Estimation Systems and Methods," Filed Jan. 17, 2013, 4 pgs.

EP Extended Search Report, dated Sep. 5, 2016, Appl No. 13871873.9, "Fast Formation Dip Angle Estimation Systems and Methods," Filed Jan. 17, 2013, 10 pgs.

\* cited by examiner

FIG. 1

Azimuthal Angle    Dip Angle

FAST FORMATION DIP ANGLE ESTIMATION SYSTEMS AND METHODS

BACKGROUND

Modern petroleum drilling and production operations demand a great quantity of information relating to the parameters and conditions downhole. Such information typically includes the location and orientation of the borehole and drilling assembly, earth formation properties, and parameters of the downhole drilling environment. The collection of information relating to formation properties and downhole conditions is commonly referred to as "logging", and can be performed during the drilling process itself (hence the term "logging while drilling" or "LWD," frequently used interchangeably with the term "measurement while drilling" or "MWD").

Various measurement tools exist for use in LWD. One such tool is the resistivity tool, which includes one or more antennas for transmitting an electromagnetic signal into the formation and one or more antennas for receiving a formation response. When operated at low frequencies, the resistivity tool may be called an "induction" tool, and at high frequencies it may be called an electromagnetic wave propagation tool. Though the physical phenomena that dominate the measurement may vary with frequency, the operating principles for the tool are consistent. In some cases, the amplitude and/or the phase of the receive signals are compared to the amplitude and/or phase of the transmit signals to measure the formation resistivity. In other cases, the amplitude and/or phase of multiple receive signals are compared to each other to measure the formation resistivity.

When plotted as a function of depth or tool position in the borehole, the logging tool measurements are termed "logs." Such logs may provide indications of hydrocarbon concentrations and other information useful to drillers and completion engineers. In particular, azimuthally-sensitive logs may provide information useful for steering the drilling assembly because they can inform the driller of the bit's direction relative to the orientation of the current bed and nearby bed boundaries, thereby enabling modifications to the drilling program that will provide much more value and higher success than would be the case using only seismic data. However, such information is of limited utility if it cannot be made available to the driller in an expeditious fashion.

BRIEF DESCRIPTION OF THE DRAWINGS

A better understanding of the various disclosed embodiments can be obtained when the following detailed description is considered in conjunction with the attached drawings, in which.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The paragraphs that follow describe illustrative apparatuses, systems and methods for fast formation dip angle estimation. An illustrative drilling environment suitable for using such apparatuses, systems and methods is first described, followed by a description of an illustrative drillstring with a logging while drilling (LWD) tool. The positional relationships between antennas housed within the LWD tool modules are also described and expressed mathematically, as are the effects of these relationships on received signals propagated through the surrounding formation. Several illustrative fast formation dip angle calculations are then described, as well as formulas that produce parameters indicative of the applicability of the fast formation dip angle calculations. The calculations and formulas are presented with the context of an illustrative system and a software-based method implemented by the system that perform the described calculations together with a decision tree that operates to decide which calculations are used to estimate the formation dip angle.

Figure 1:
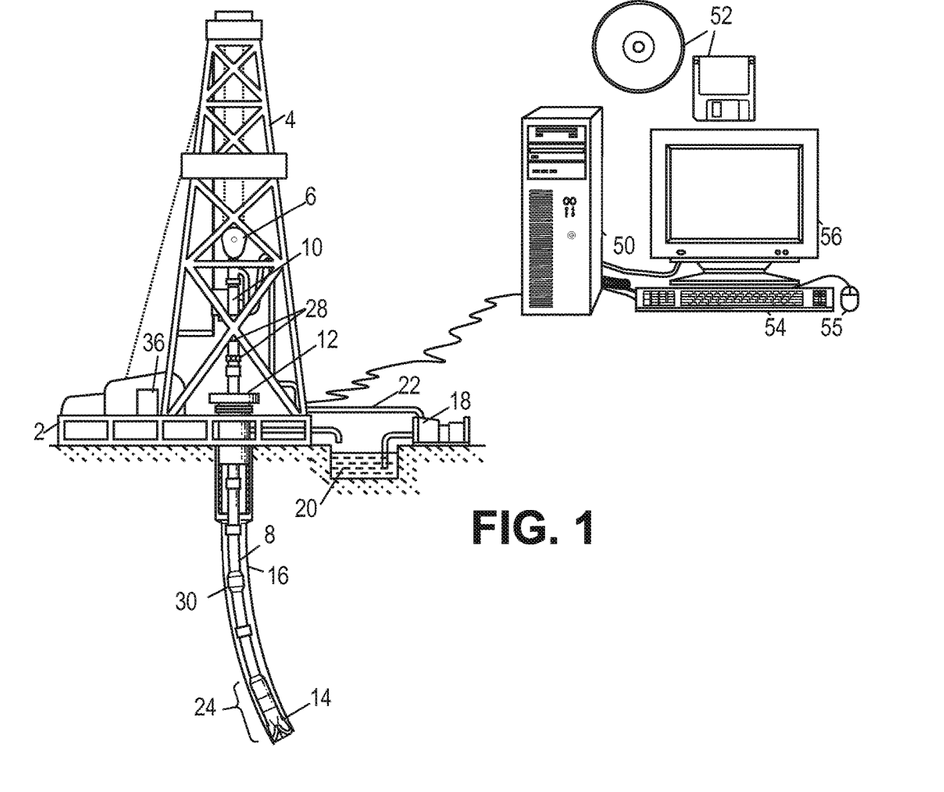
FIG. 1 shows an illustrative logging while drilling (LWD) environment.

The disclosed apparatuses, systems and methods are best understood in the context of the larger systems in which they operate. Accordingly, FIG. 1 shows an illustrative LWD environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where the fluid is filtered and recirculated.

The drill bit 14 is just one piece of a bottom-hole assembly 24 that includes a mud motor and one or more "drill collars" (thick-walled steel pipe) that provide weight and rigidity to aid the drilling process. Some of these drill collars include built-in logging instruments to gather measurements of various drilling parameters such as location, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

Also included in bottom-hole assembly 24 is a telemetry sub that maintains a communications link with the surface. Mud pulse telemetry is one common telemetry technique for transferring tool measurements to surface receivers and receiving commands from the surface, but other telemetry techniques can also be used. For some techniques (e.g., through-wall acoustic signaling) the drill string 8 includes one or more repeaters 30 to detect, amplify, and re-transmit the signal. At the surface, transducers 28 convert signals between mechanical and electrical form, enabling a network interface module 36 to receive the uplink signal from the telemetry sub and (at least in some embodiments) transmit a downlink signal to the telemetry sub. A data processing system 50 receives a digital telemetry signal, demodulates the signal, and displays the tool data or well logs to a user.

Software (represented in FIG. 1 as non-transitory information storage media 52) governs the operation of system 50. A user interacts with system 50 and its software 52 via one or more input devices 54 and 55 and one or more output devices 56. In some system embodiments, a driller employs the system to make geosteering decisions and communicate appropriate commands to the bottom-hole assembly 24.

The bottom-hole assembly 24 may still further include a steering mechanism which the driller can employ to change the borehole's trajectory in response to their analysis of the logging measurements. Illustrative steering mechanisms include controllable fins, drilling plows, or bent subs. A rotary steerable system (RSS) may be coupled to such steering mechanisms to enable geosteering even as the drillstring continues rotating.

One formation parameter of interest to drillers making geosteering decisions is the true dip of a formation. As is well known in the art, the dip is the steepest angle of descent of a tilted bed or other formation feature relative to a horizontal plane. True dip is the dip measured perpendicular to the formation's strike line (i.e., a line marking the intersection of the bed or feature with a horizontal plane). (It can also be expressed as the angle between the vertical axis and a vector normal to the formation bedding plane.) A related parameter is the relative dip, which is the angle measured between the borehole axis and the vector normal to the formation bedding plane. For example, the driller may measure the relative dip of the formation and employ that information to maintain the borehole trajectory within the formation bed as much as possible (relative dip angle near 90°) or to exit the bed as expeditiously as possible (relative dip angle near 0° or 180°).

As shown in more detail below, true and/or relative dip can be estimated based on multi-component/tri-axial resistivity measurements. In at least some illustrative embodiments, such measurements are obtained using LWD tools that incorporate tri-axial transmit and receive coils and/or azimuthally sensitive transmit and receive antennas that transmit and receive signals that can be decomposed into and modeled as orthogonal components. In general, coupling between the transmit and receive antennas of such LWD tools can be expressed as a tensor of the form:

$$T = \begin{bmatrix} T_xR_x & T_xR_y & T_xR_z \\ T_yR_x & T_yR_y & T_yR_z \\ T_zR_x & T_zR_y & T_zR_z \end{bmatrix}. \quad (1)$$

wherein each component $T_iR_j$ represents a theoretical signal at a receive antenna with a j-axis orientation (x, y or z) in response to a signal from a transmit antenna with an i-axis orientation (also x, y or z).

Figure 2:
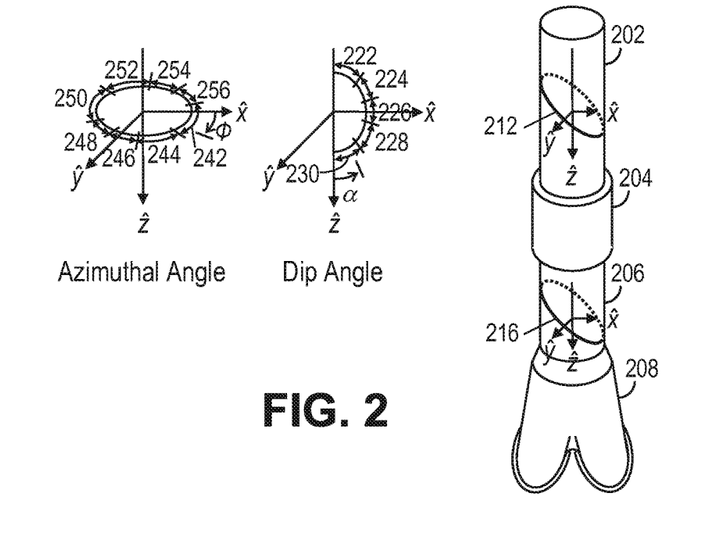
FIG. 2 shows an illustrative LWD tool mounted along a drillstring.

In at least some illustrative embodiments, the above-described x, y and z orientations are defined by coordinate system axes that are aligned with the axis of the drillstring and with other formation features (e.g., the strike and dip of the formation). FIG. 2 shows a drillstring with an illustrative LWD tool together with coordinate systems corresponding to each of the transmit and receive antennas. The LWD tool includes two modules 202 and 206 separated by a rotary steering system 204 and coupled to a drill bit 208. LWD module 202 includes a receive antenna 212 and LWD module 206 includes a transmit antenna 216, although either module may either a transmit or a receive antenna, as well as any number of additional transmit and/or receive antennas. The z-axis of the right-handed coordinate system of FIG. 2 is aligned with the drillstring axis with x and y axes as shown. It should be noted that although it is possible for receive antenna 212 and transmit antenna 216 to become misaligned with respect to each other because of twisting of the drillstring or positional and orientation changes deliberately introduced by a rotary steering system 204, such misalignments can be corrected using known matrix rotations that mathematically re-align the two antenna coordinate systems and adjust the tensor components appropriately. Thus, the systems and methods described herein may also be used with multi-module LWD tools even in the presence of such misalignment.

As the drillstring and LWD tool modules rotate, a rotational or azimuthal angle ϕ describes the orientation of the antennas within a plane defined by the x and y axes, as illustrated by the azimuthal angle graph of FIG. 2. To facilitate acquisition and processing of the measured receive antenna data, in at least some illustrative embodiments the borehole is divided into azimuthal bins (i.e., rotational angle ranges). In the azimuthal angle graph of FIG. 2, the circumference has been divided into eight bins numbered 242 through 256, though larger or smaller numbers of bins may be employed. As the rotating tool gathers azimuthally sensitive measurements, the measurements can be associated with one of these bins and with a depth value. Typically LWD tools rotate much faster than they progress along the borehole, so that each bin at a given depth can be associated with a large number of measurements. Within each bin at a given depth, these measurements can be combined (e.g., averaged) to improve their reliability.

For dipping heterogeneous formations (e.g., a dipping formation near a bed boundary) wherein the z-axis represents the LWD tool axis along a drillstring, it is known that if the y-axis of the tool coordinate system is parallel to the formation's strike line, cross-coupling between x-y and y-z transmitter/receiver pairs is negligible. This situation is represented by the tensor of equation (2), $$T = \begin{bmatrix} T_xR_x & 0 & T_xR_z \\ 0 & T_yR_y & 0 \\ T_zR_x & 0 & T_zR_z \end{bmatrix}, \quad (2)$$

which provides a basis for determining the dip angle as described in more detail below.

It should be noted that because the $T_yR_y$ component for a tool at an azimuthal angle of 0° is equal to the $T_xR_x$ component for a tool at 90° at a given borehole depth z, equation (2) may be alternatively expressed as equation (3):

$$T = \begin{bmatrix} T_xR_{x_{\phi=0}} & 0 & T_xR_{z_{\phi=0}} \\ 0 & T_xR_{x_{\phi=90}} & 0 \\ T_zR_{x_{\phi=0}} & 0 & T_zR_{z_{\phi=0}} \end{bmatrix}. \quad (3)$$

The coupling tensor may thus be expressed in terms of measurements by the tool antennas providing only x and z measurements, reducing the number of antennas needed to identify the tensor components. Nonetheless, for simplicity the equations below refer to the center tensor component as $T_yR_y$, with all components values corresponding to an azimuthal angle ϕ equal to zero.

The coupling tensor can be evaluated for all azimuthal orientations of the tool to find the orientation at which the tensor form most closely approximates equation (2). (Hereafter, this tensor is termed the "strike-aligned" tensor.) Alternatively, the dip azimuth can be calculated from an arbitrarily-oriented tensor as:

$$\phi_{dip} = \tan^{-1}\left(\frac{T_{yz} + T_{zy}}{T_{xz} + T_{zx}}\right). \quad (4)$$

and the tensor rotated by that angle to achieve a form that approximates equation (2).

In at least some illustrative embodiments, once a strike-aligned tensor has been identified, a rotation operation over a range of artificial dip angles α is performed about the y-axis to produce rotated tensor $T^R$, as expressed in equation (5):

$$T^R = \begin{bmatrix} \cos\alpha & 0 & -\sin\alpha \\ 0 & 1 & 0 \\ \sin\alpha & 0 & \cos\alpha \end{bmatrix}^T \begin{bmatrix} T_xR_x & 0 & T_xR_z \\ 0 & T_yR_y & 0 \\ T_zR_x & 0 & T_zR_z \end{bmatrix} \begin{bmatrix} \cos\alpha & 0 & -\sin\alpha \\ 0 & 1 & 0 \\ \sin\alpha & 0 & \cos\alpha \end{bmatrix}. \quad (5)$$

Because rotated tensor $T^R$ is computed for a sweep of artificial dip angles α between 0° and 180° for all logged depths z, the rotated tensor components are each a function of both α and z, except for $T_yR_y$ which is only a function of z since the rotation is performed about the y-axis. Rotated tensor $T^R$ may thus alternatively be expressed as shown in equation (6):

$$T = \begin{bmatrix} T_xR_x(\alpha, z) & 0 & T_xR_z(\alpha, z) \\ 0 & T_yR_y(z) & 0 \\ T_zR_x(\alpha, z) & 0 & T_zR_z(\alpha, z) \end{bmatrix}. \quad (6)$$

As with the azimuthal angle, the range of artificial dip angles may also be divided into bins to simplify the processing described below for determining the actual dip angle. In the dip angle graph of FIG. 2, the range of artificial dip angles has been divided into five bins numbered 222 through 230, though larger or smaller numbers of bins may be employed.

Once the rotated tensor of equation (6) has been computed, the actual formation dip angle $\alpha^t$ can be quickly estimated (compared to other computationally intensive methods) based upon any of a number of the rotated tensor components and/or combinations of components. Equations (7) through (10) list four examples of such fast dip angle estimation calculations:

$$\alpha^t(z) = \min_\alpha \left| \frac{\partial\left[\frac{\partial T_xR_x(\alpha, z)}{\partial z}\right]}{\partial \alpha} \right|, \quad (7)$$

$$\alpha^t(z) = \min_\alpha \left| \frac{\partial\left[\frac{\partial T_zR_z(\alpha, z)}{\partial z}\right]}{\partial \alpha} \right|, \quad (8)$$

$$\alpha^t(z) = \min_\alpha \left| \frac{\partial\left[\frac{\partial (T_xR_z(\alpha, z) + T_zR_x(\alpha, z))}{\partial z}\right]}{\partial \alpha} \right|, \text{ and} \quad (9)$$

-continued $$\alpha^t(z) = \min_\alpha \left| \frac{\partial\left[\frac{\partial (a*T_zR_z(\alpha, z) + b*T_xR_x(\alpha, z))}{\partial z}\right]}{\partial \alpha} \right|. \quad (10)$$

Where binning of the swept artificial dip angle is used, min, produces the angle associated with the dip angle bin corresponding to the smallest absolute value of the indicated calculation. (Since this is the dip angle measured relative to the tool axis, it is the relative dip angle defined previously. The true dip angle and true dip azimuth can be readily derived from the orientation of the tool combined with the relative dip angle and relative dip azimuth.) To improve the results of these equations when the LWD tool is crossing a formation boundary, a one-dimensional median filter may be applied to the measured values prior to applying the above equations to the tensor components.

As previously noted, the above-described dip angle estimation is suitable for use within heterogeneous formation, but not necessarily for other formations. Thus, in at least some illustrative embodiments, a decision tree is implemented to identify the nature of the formation and which estimation technique, if any, can be used to estimate the identified formation's dip angle. Such an illustrative embodiment includes a first test to determine if the formation is isotropic and homogenous, a second test to determine if the formation is dipping and heterogeneous, and optionally a third test to decide if the formation is horizontal or anisotropic and homogeneous.

Figure 3:
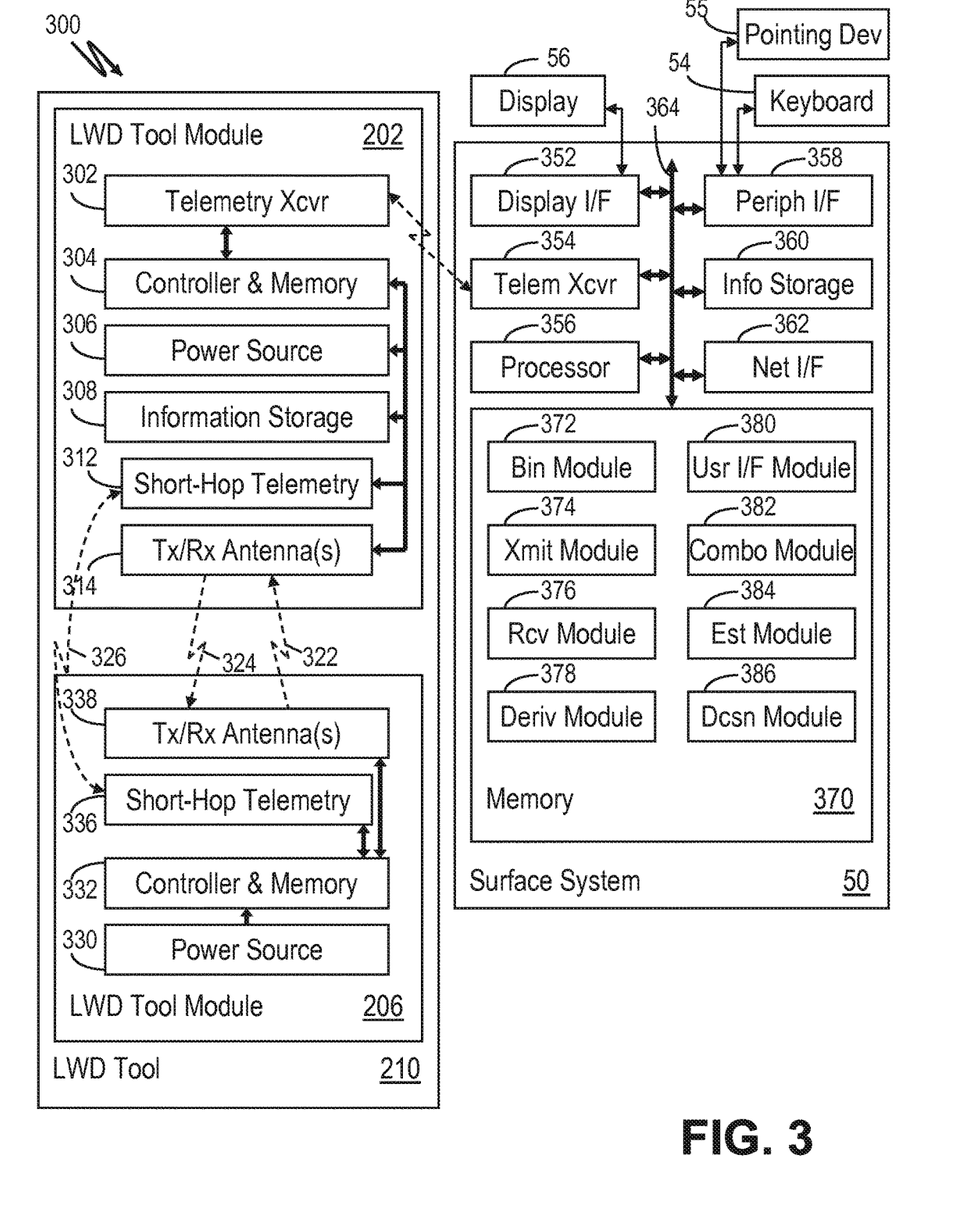
FIG. 3 shows a block diagram of two logging tool modules and a surface system.

FIG. 3 is a block diagram of illustrative electronics for an LWD system 300 suitable for implementing the above-described decision tree, as well as the preceding data collection and resulting dip angle estimations. The system includes an LWD tool 210 that includes LWD tool modules 202 and 206, as well as a surface system 50. Surface system 50 is suitable for collecting, processing and displaying logging data via display 56, and in at least some embodiments generates geosteering signals from the logging data measurements and displays them to a user. A user may further interact with the system via keyboard 54 and pointing device 55 (e.g., a mouse) to send commends to the LWD tool 210 to steer the drillstring in response to the received data. If desired, surface system 50 can be programmed to send such commands automatically in response to logging data measurements, thereby enabling surface system 50 to serve as an autopilot for the drilling process.

Located within surface system 50 is a display interface 352, a telemetry transceiver 354, a processor 356, a peripheral interface 358, an information storage device 360, a network interface 362 and a memory 370. Bus 364 couples each of these elements to each other and transports their communications. Telemetry transceiver 354 enables the surface system 50 to communicate with the LWD tool and its modules (either directly or indirectly), and network interface 362 enables communications with other systems (e.g., a central data processing facility via the Internet). In accordance with user input received via peripheral interface 358 and program instructions from memory 370 and/or information storage device 360, processor 356 processes telemetry information received via telemetry transceiver 354 to estimate the formation dip angle in accordance with the disclosed methods and/or geosteering signals, and display them to the user.

Surface system 50 communicates with LWD tool module 202, which receives control messages from, and provides measurement data to, surface system 50 via telemetry transceiver 302. Controller and memory 304 couples to telemetry transceiver 302, power source 306, information storage device 308, a short hop telemetry transceiver 312 and one or more receive and/or transmit antennas 314, coordinating the operation of the various components. In some illustrative embodiments transmit/receive antenna(s) 314 receives electromagnetic signals 322 transmitted by LWD tool module 206 that are used to measure the electrical characteristics of the surrounding formation. In other embodiments, controller and memory 304 causes transmit/receive antenna(s) 314 to transmit electromagnetic signals 324 which are received and measured by LWD tool module 206. The measurements are communicated by wireless signal 326 from LWD tool module 206 to LWD tool module 302 via short hop telemetry transceiver 312. The measurement information is forwarded to controller and memory 304 for storage within information storage device 308, with at least some of this information being communicated to surface system 50.

LWD tool module 206 includes a power source 330, controller and memory 332, short hop telemetry transceiver 336 and transmit/receive antenna(s) 338, each coupled to each other and operating in a manner similar to the corresponding components of LWD tool module 202. In some embodiments, LWD tool module 206 transmits electromagnetic signals 322 for measurement by logging tool module 202, while in others LWD tool module 206 receives electromagnetic signals 324 transmitted by logging tool module 202. LWD tool modules 202 and 206 exchange information via short hope telemetry transceivers 312 and 336 that can include electromagnetic signal measurements, transmit/receive synchronization signals and configuration and control commands. This information may originate from any component within the system, including but not limited to controller and memory 304 and 332, and surface system 50. The power sources 306 and 330 used to power the downhole components of LWD tool modules 202 and 206 may include batteries, vibration energy harvesters, turbines, electrical generators or any other suitable mechanism. Transmit/receive antennas 314 and 338 may include any of a number of antennas, including but not limited to azimuthally sensitive antennas such as tilted loop antennas. Short hop telemetry transceivers 312 and 336 may use any suitable short hop downhole communications technique. Also, additional sensors (not shown) may also be incorporated into each LWD tool module and can include temperature, pressure, lubrication, vibration, strain and density sensors to monitor drilling conditions.

Surface system processor 356 and LWD tool module controllers and memories 304 and 332 each generally operates in accordance with one or more programs stored on an information storage medium (e.g., information storage device 360). These programs cause the controller and/or processing system to carry out at least part of the methods disclosed herein. For simplicity, the description of the method that follows assumes that each of the modules performing the described functions are all resident within memory 370 and executed by processor 356 of surface system 50 (as shown in FIG. 3). Nonetheless, it is contemplated that one or more of these functions may be performed by modules resident in memory within one of LWD tool modules 202 or 206, and executed by a corresponding downhole processor and/or controller.

Figure 4:
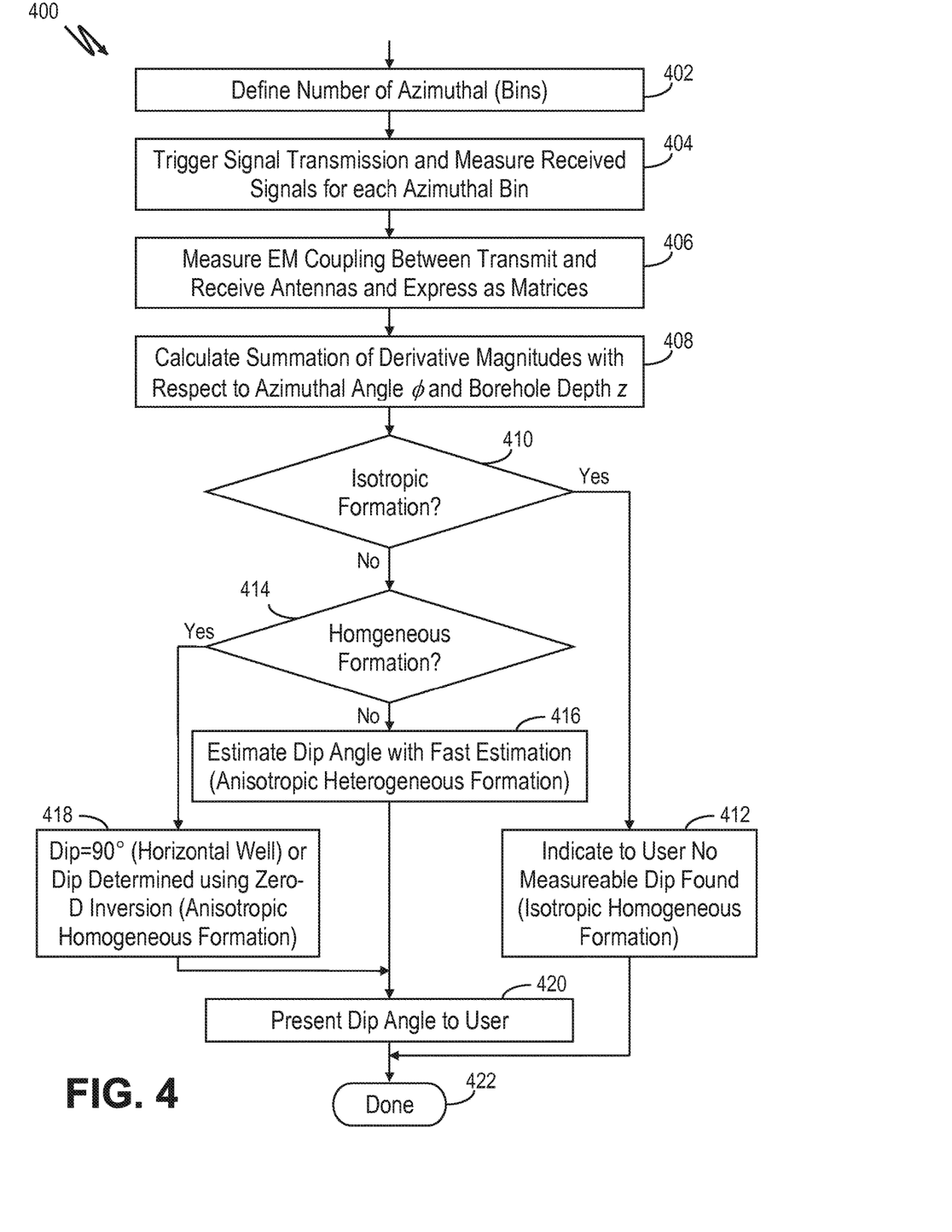
FIG. 4 shows an illustrative method for fast formation dip angle estimation.

Referring now to both the illustrative system 300 of FIG. 3 and the illustrative method 400 of FIG. 4, the number of azimuthal bins is defined (block 402, FIG. 4; binning module 372, FIG. 3), after which electromagnetic signal transmission is triggered (e.g., signals 322 from a transmit antenna 338 within LWD tool module 206, triggered by transmit module 374; block 404). The transmitted signals propagate through the surrounding formation to a receive antenna (e.g., receive antenna 314 within LWD tool module 202), where the signal is sampled and measured for each azimuthal bin (block 404; receive module 376). The sampled data is subsequently used to produce coupling tensors as previously described corresponding to each azimuthal bin (block 406; receive module 376).

To determine whether the formation is isotropic and homogeneous, a derivative of one of the rotated tensor components (e.g., the TxRx component) with respect to the azimuthal angle may be calculated for each azimuthal bin and combined (block 408; derivative module 378 and combination module 382). Equation (11) shows an example of such a calculation and combination of values:

$$\sum_{i=0}^{N-1} \left| \frac{\partial T_x R_x}{\partial \phi} \right|_i, \quad (11)$$

where the circumference around the LWD tool is subdivided into N azimuthal angle bins and the summation is calculated over N absolute values of azimuthal angle derivatives, each absolute value corresponding to an $i^{th}$ azimuthal angle bin. If the combination of derivatives yields a value that is substantially zero (i.e., no significant variations of the coupling component as a function of azimuthal angle; block 410; decision module 386), the user is informed that the surrounding formation is isotropic and homogenous with no measurable dip angle that can be estimated at that location (block 412; user interface module 380), ending the method (block 422). If the combination of values yields a substantially non-zero value (e.g., a value that differs from zero by at least 1% of $$\frac{\sum_{i=0}^{N-1} |T_x R_x|}{N};$$

block 410; decision module 386), the formation is anisotropic and additional testing is performed.

In at least some illustrative embodiments, the second test determines if a heterogeneous dipping formation is present by performing a combination of derivatives similar to the first, but this time using derivatives with respect to borehole depth (block 408; derivative module 378 and combination module 382). Equation (12) shows an example of this second calculation:

$$\sum_{i=0}^{N-1} \left| \frac{\partial T_x R_x}{\partial z} \right|_i, \quad (12)$$

where the circumference around the LWD tool is subdivided into N azimuthal angle bins and the summation is calculated over N absolute values of azimuthal angle derivatives, each absolute value corresponding to an $i^{th}$ azimuthal angle bin. If the second combination of derivatives yields a substantially non-zero value (i.e., indicative of significant variations of the coupling component as a function of borehole depth; block 414; decision module 386), then the formation is a dipping heterogeneous formation and the dip angle can be estimated using the above-described formation dip angle estimation (block 416; estimation module 384) using, for example any of equations (7) through (10). The resulting dip angle is subsequently presented to the user (block 420; user interface module 380), ending the method (block 422).

If the second combination instead yields a value that is substantially zero (within less than a tolerance value of zero; block 414; decision module 386), a third optional test can be performed to differentiate between a horizontal well and a dipping well within a homogeneous formation. Equation (13) shows an example of this optional third equation:

$$\Sigma_{i=0}^{N-1}(T_xR_z+T_zR_x)_i, \quad (13)$$

where the circumference around the LWD tool is subdivided into N azimuthal angle bins and the summation is calculated over N additions of x-z cross coupled tensor components, each set of components corresponding to an $i^{th}$ azimuthal angle bin. If the third combination yields a value of substantially zero, then a horizontal formation is present and the relative dip angle is 90° (block 418; estimation module 384). If the third combination yields a substantially non-zero value, a dipping anisotropic homogenous formation surrounds the tool, and the dip angle can be determined using a Zero-D inversion (block 418; estimation module 384). Such inversions are well known in the art and are not discussed further. The relative dip angle (90° or the angle estimated by the Zero-D inversion) is presented to the user (block 420, user interface module 380), ending the method (block 422).

Some alternative embodiments have the tool automatically adjusting a steering direction to maintain the relative dip angle at a desired value (e.g., 90°).

Numerous other modifications, equivalents, and alternatives, will become apparent to those skilled in the art once the above disclosure is fully appreciated. For example, the antenna coupling measurements can be communicated to a surface processing system for storage and processing in real time or later. Measurements acquired by wireline tools or other logging instruments not associated with drilling or geosteering can also be subjected to the foregoing methods. It is intended that the following claims be interpreted to embrace all such modifications, equivalents, and alternatives where applicable.

What is claimed is:

1. A logging tool, comprising:
   at least one transmit antenna;
   at least one receive antenna;
   a controller, coupled to the at least one transmit antenna and the at least one receive antenna, that:
      measures a plurality of coupling parameters between the at least one transmit antenna and the at least one receive antenna, at least one of said coupling parameters being measured as a function of depth and azimuthal angle;
      determines if a surrounding formation is anisotropic and heterogeneous based at least in part on said at least one of said coupling parameters, and if so, derives an estimated relative dip angle from a partial derivative with respect to depth and artificial dip angle of at least one of said coupling parameters, and derives a true dip angle from the orientation of the logging tool combined with the estimated relative dip angle and a relative dip azimuth;
      generates geosteering signals from logging data measurements comprising the estimated relative dip angle; and
      automatically adjusts a drilling direction of a drillstring comprising the logging tool based at least in part upon the estimated relative dip angle.

2. The logging tool of claim 1, wherein said at least one of said coupling parameters $T_xR_x$ having a derivative with respect to azimuthal angle $\phi$, wherein a circumference around the logging tool is subdivided into N azimuthal angle bins (herein numbered i=0 to N−1) and wherein anisotropy is determined to be present if $$\sum_{i=0}^{N-1}\left|\frac{\partial T_xR_x}{\partial \phi}\right|_i$$

is not substantially equal to zero, wherein $T_xR_x$ is a signal at a receive antenna in response to a signal from a transmit antenna.

3. The logging tool of claim 2, wherein said at least one of said coupling parameters is $T_xR_x$ having a derivative with respect to depth z and wherein heterogeneity is determined to be present if $$\sum_{i=0}^{N-1}\left|\frac{\partial T_xR_x}{\partial z}\right|_i$$

is not substantially equal to zero, wherein $T_xR_x$ is a signal at a receive antenna in response to a signal from a transmit antenna.

4. The logging tool of claim 1, wherein, as part of deriving the estimated relative dip angle, the controller:
   expresses the plurality of coupling parameters as a strike-aligned tensor that is a function of depth;
   rotates the strike-aligned tensor through a plurality of artificial dip angles to produce a rotated coupling tensor that is a function of the borehole depth z and the artificial dip angle $\alpha$;
   calculates a partial derivative with respect to depth and artificial dip angle of one or more coupling parameters in the rotated coupling tensor; and
   finds the estimated relative dip angle to be the one that minimizes an absolute value of the partial derivative.

5. The logging tool of claim 4, wherein the one or more coupling parameters comprise $T_xR_x(\alpha,z)$ and $T_zR_z(\alpha,z)$, wherein $T_xR_x$ and $T_zR_z$ are signals at a receive antenna in response to signals from a transmit antenna.

6. The logging tool of claim 4, wherein the one or more coupling parameters comprise $T_xR_x(\alpha,z)$ and $T_zR_x(\alpha,z)$, wherein $T_xR_x$ and $T_zR_z$ are signals at a receive antenna in response to signals from a transmit antenna.

7. A logging while drilling (LWD) system that comprises:
   a surface system;
   a drillstring; and
   an LWD tool, positioned along the drillstring and coupled to the surface system, that comprises:
      at least one transmit antenna;
      at least one receive antenna; and
      a controller, coupled to the transmit and receive antennas, that measures a plurality of coupling parameters between the at least one transmit antenna and the at least one receive antenna, at least one of said coupling parameters being measured as a function of depth and azimuthal angle;

wherein the LWD system determines if a surrounding formation is anisotropic and heterogeneous based at least in part on said at least one of said coupling parameters, and if so, derives an estimated relative dip angle from a partial derivative with respect to depth and artificial dip angle of at least one of said coupling parameters, and derives a true dip angle from the orientation of the logging tool combined with the estimated relative dip angle and a relative dip azimuth;

wherein the LWD system generates geosteering signals from logging data measurements comprising the estimated relative dip angle;

wherein a drilling direction of the drillstring is adjusted based at least in part upon the estimated relative dip angle, and wherein said adjustment is performed automatically by the LWD system or in response to one or more manual commands accepted by the LWD system from a user.

8. The LWD system of claim 7, wherein said at least one of said coupling parameters is $T_xR_x$ having a derivative with respect to azimuthal angle $\phi$, wherein a circumference around the logging tool is subdivided into N azimuthal angle bins (herein numbered i=0 to N−1) and wherein anisotropy is determined to be present if $$\sum_{i=0}^{N-1} \left| \frac{\partial T_x R_x}{\partial \phi} \right|_i$$

is not substantially equal to zero, wherein $T_xR_x$ is a signal at a receive antenna in response to a signal from a transmit antenna.

9. The LWD system of claim 8, wherein said at least one of said coupling parameters $T_xR_x$ having a derivative with respect to depth z and wherein heterogeneity is determined to be present if $$\sum_{i=0}^{N-1} \left| \frac{\partial T_x R_x}{\partial z} \right|_i$$

is not substantially equal to zero, wherein $T_xR_x$ is a signal at a receive antenna in response to a signal from a transmit antenna.

10. The LWD system of claim 7, wherein, as part of deriving the estimated relative dip angle, the LWD system:
expresses the plurality of coupling parameters as a strike-aligned tensor that is a function of depth;
rotates the strike-aligned tensor through a plurality of artificial dip angles to produce a rotated coupling tensor that is a function of the borehole depth z and the artificial dip angle α;
calculates a partial derivative with respect to depth and artificial dip angle of one or more coupling parameters in the rotated coupling tensor; and
finds the estimated relative dip angle to be the one that minimizes an absolute value of the partial derivative.

11. The LWD system of claim 10, wherein the one or more coupling parameters comprise $T_xR_x(\alpha,z)$ and $T_zR_z(\alpha,z)$, wherein $T_xR_x$ and $T_zR_z$ are signals at a receive antenna in response to signals from a transmit antenna.

12. The LWD system of claim 10, wherein the one or more coupling parameters comprise $T_xR_x(\alpha,z)$ and $T_zR_x(\alpha,z)$, wherein $T_xR_x$ and $T_zR_z$ are signals at a receive antenna in response to signals from a transmit antenna.

13. The LWD system of claim 7, wherein the surface system or the controller within the LWD tool at least in part determines if the surrounding formation is anisotropic and heterogeneous.

14. A method for dip angle estimation, comprising:
measuring a plurality of coupling parameters between at least one transmit antenna and at least one receive antenna of a logging tool positioned along a drillstring within a borehole, at least one of said coupling parameters being measured as a function of depth and azimuthal angle;
determining if a surrounding formation is anisotropic and heterogeneous based at least in part on said at least one of said coupling parameters, and if so, deriving a relative dip angle from a partial derivative with respect to depth and artificial dip angle of at least one of said coupling parameters, and deriving a true dip angle from the orientation of the logging tool combined with the relative dip angle and a relative dip azimuth;
generating geosteering signals from logging data measurements comprising the relative dip angle; and
adjusting a drilling direction of the drillstring based at least in part upon the relative dip angle.

15. The method of claim 14, wherein said at least one of said coupling parameters is $T_xR_x$ having a derivative with respect to azimuthal angle $\phi$, wherein a circumference around the logging tool is subdivided into N azimuthal angle bins (herein numbered i=0 to N−1) and further comprising determining that anisotropy is present if $$\sum_{i=0}^{N-1} \left| \frac{\partial T_x R_x}{\partial \phi} \right|_i$$

is not substantially equal to zero, wherein $T_xR_x$ is a signal at a receive antenna in response to a signal from a transmit antenna.

16. The method of claim 15, wherein said at least one of said coupling parameters is $T_xR_x$ having a derivative with respect to depth z and further comprising determining that heterogeneity is present if $$\sum_{i=0}^{N-1} \left| \frac{\partial T_x R_x}{\partial z} \right|_i$$

is not substantially equal to zero, wherein $T_xR_x$ is a signal at a receive antenna in response to a signal from a transmit antenna.

17. The method of claim 14, wherein deriving the relative dip angle further comprises:
expressing the plurality of coupling parameters as a strike-aligned tensor that is a function of depth;
rotating the strike-aligned tensor through a plurality of artificial dip angles to produce a rotated coupling tensor that is a function of the borehole depth z and the artificial dip angle α;
calculating a partial derivative with respect to depth and artificial dip angle of one or more coupling parameters in the rotated coupling tensor; and
finding the relative dip angle to be the one that minimizes an absolute value of the partial derivative.

18. The method of claim 17, wherein the one or more coupling parameters comprise $T_xR_x(\alpha,z)$ and $T_zR_z(\alpha,z)$, wherein $T_xR_x$ and $T_zR_z$ are signals at a receive antenna in response to signals from a transmit antenna.

19. The method of claim 17, wherein the one or more coupling parameters comprise $T_xR_z(\alpha,z)$ and $T_zR_x(\alpha,z)$, wherein $T_xR_x$ and $T_zR_z$ are signals at a receive antenna in response to signals from a transmit antenna.

* * * * *